(12) United States Patent
Epstein et al.

(10) Patent No.: US 11,704,679 B2
(45) Date of Patent: Jul. 18, 2023

(54) ADAPTIVE VALIDATION AND REMEDIATION SYSTEMS AND METHODS FOR CREDENTIAL FRAUD

(71) Applicant: Synamedia Limited, Staines upon Thames (GB)

(72) Inventors: Steven Jason Epstein, Hashmonaim (IL); Nadav Avikasis, Kfar Adumin (IL); Yaakov Tayeb, Tzur Hadassa (IL); Eyal Irit Zmora, Nes Harim (IL); Teddy Kevin Rose, Jerusalem (BE)

(73) Assignee: Synamedia Limited, Staines upon (GB)

( * ) Notice: Subject to any disclaimer, the term of this patent is extended or adjusted under 35 U.S.C. 154(b) by 36 days.

(21) Appl. No.: 16/932,788

(22) Filed: Jul. 19, 2020

(65) Prior Publication Data
US 2022/0020033 A1    Jan. 20, 2022

(51) Int. Cl.
*G06Q 30/00* (2023.01)
*G06Q 30/02* (2023.01)
(Continued)

(52) U.S. Cl.
CPC ..... *G06Q 30/0185* (2013.01); *G06Q 10/0635* (2013.01); *G06Q 20/1235* (2013.01);
(Continued)

(58) Field of Classification Search
CPC .......... G06Q 30/0185; G06Q 10/0635; G06Q 30/0205; G06Q 50/01; G06Q 50/265;
(Continued)

(56) References Cited

U.S. PATENT DOCUMENTS 8,875,267 B1   10/2014   Kolman et al.
9,092,782 B1    7/2015   Zaslavsky et al.
(Continued)

FOREIGN PATENT DOCUMENTS

CN    109922032 A    6/2019
WO      00/25251 A1   5/2000

OTHER PUBLICATIONS

Extended European Search Report dated Dec. 20, 2021, European Patent Application No. 21182930.4, pp. 1-10.

*Primary Examiner* — Clifford B Madamba
(74) *Attorney, Agent, or Firm* — Fernando & Partners, LLP

(57) ABSTRACT

Techniques for adaptive validation and remediation are described. In some embodiments, the method includes determining, for a plurality of media service accounts, corresponding fraud suspicion values based on a model. The method also includes identifying a plurality of suspected accounts based on the corresponding fraud suspicion values. The method additionally includes identifying one or more suspected devices and predicting a likelihood of account takeover from each of the one or more suspected devices. The method further includes detecting a triggering event from a device of the one or more suspected devices associated with an account. The method additionally includes executing a validation and/or remediation procedure based on a trigger sensitivity value associated with the triggering event, a respective likelihood of account takeover from the device associated with the account, a respective device risk value associated with the device, and a respective fraud suspicion value associated with the account.

20 Claims, 8 Drawing Sheets

(51) Int. Cl.

| | |
|---|---|
| *G06Q 10/06* | (2023.01) |
| *G06Q 20/12* | (2012.01) |
| *G06Q 40/02* | (2023.01) |
| *G06Q 50/00* | (2012.01) |
| *G06Q 50/26* | (2012.01) |
| *G06F 21/55* | (2013.01) |
| *G06F 21/56* | (2013.01) |
| *G06N 20/00* | (2019.01) |
| *H04L 9/40* | (2022.01) |
| *G06Q 30/018* | (2023.01) |
| *G06Q 10/0635* | (2023.01) |
| *G06Q 30/0204* | (2023.01) |

(52) U.S. Cl.
 CPC ......... *G06Q 30/0205* (2013.01); *G06Q 50/01* (2013.01); *G06Q 50/265* (2013.01)

(58) Field of Classification Search
 CPC .. G06Q 20/1235; G06Q 40/02; G06F 21/554; G06F 21/566; G06N 20/00; H04L 63/1466
 USPC .......................................................... 705/35
 See application file for complete search history.

(56) References Cited

U.S. PATENT DOCUMENTS

| | | | |
|---|---|---|---|
| 9,262,610 B2* | 2/2016 | Hudack | ................. G06F 21/316 |
| 9,396,332 B2 | 7/2016 | Abrams et al. | |
| 2013/0139236 A1* | 5/2013 | Rubinstein | .......... H04L 63/1466 726/26 |
| 2015/0026027 A1* | 1/2015 | Priess | .................... G06Q 10/04 705/35 |
| 2015/0082448 A1* | 3/2015 | Elovici | ................. G06Q 10/107 726/26 |
| 2018/0033089 A1 | 2/2018 | Goldman et al. | |
| 2019/0018956 A1 | 1/2019 | Sadaghiani et al. | |
| 2019/0349351 A1 | 11/2019 | Verma et al. | |

* cited by examiner

| Triggering Event | Sensitivity |
|---|---|
| Buy Mobile Phone | 90 |
| Change email address | 80 |
| Change Phone Number | 75 |
| New Service Used | 70 |
| New Device Registered | 60 |
| New Location to Same Device | 50 |
| New Time of Day to Login | 50 |
| New Genre Watched | 30 |
| Bad Password entered multiple times | 30 |
| Respond to suspicion Alert | 95 |

| Trigger Sensitivity | Account Risk | Device Risk | Account Takeover Risk | Verification Policy | Fraud Policy if verification Fails | Fraud Policy if verification Succeeds |
|---|---|---|---|---|---|---|
| <30 | All | ALL | All | None | N/A | N/A |
| >30 <60 | <50 | <30 | N/A | None | N/A | N/A |
| >30 <60 | >50 | <30 | N/A | Provide Password | Suspend Account | Change Password |
| >30 <60 | >50 | >30 | <20 | Answer 1 or more Security Questions | Blacklist Device | Change Password |
| >30 <60 | >50 | >30 | >20 | Biometric / MFA | Suspend Account | Change Password |
| >60 | <50 | <30 | N/A | Provide Password | Suspend Account | Change Password |
| >60 | >50 | <30 | N/A | Answer 1 or more Security Questions | Blacklist Device | Change Password |
| >60 | >50 | >30 | <20 | Answer 1 or more Security Questions | Suspend Account | Change Password |
| >60 | >50 | >30 | >20 | None | Suspend Account and Blacklist Device | |

Figure 3

ADAPTIVE VALIDATION AND REMEDIATION SYSTEMS AND METHODS FOR CREDENTIAL FRAUD

TECHNICAL FIELD

The present disclosure relates generally to computer-implemented anti-fraud techniques in media services.

BACKGROUND

Credential stuffing is a type of cyberattack, where an attacker uses stolen account credentials (often from a data breach) to gain unauthorized access to digital services. Unlike credential cracking, credential stuffing attacks do not attempt to brute force or guess any passwords. Instead, using thousands to millions of previously discovered credentials, credential stuffing attacks automate the logins. Credential stuffing attacks are possible because users often have the same username and password across multiple accounts, e.g., using the same username and password for emails and media content subscriptions. Given the number of breaches and credentials associated with known subscription services, it is difficult for previously existing systems and methods to detect credential stuffing attacks in media services. In many cases, a passive non-paying media service subscriber uses the stolen credential(s) to get free access to media service(s) without being noticed by the account owner for months if not years. In some cases, credential stuffing attacks are problematic when a malicious user makes purchases using the true account owner's credit card and/or locks out the true account owner.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 3 is an exemplary policy table, in accordance with some embodiments;

Figure 1:
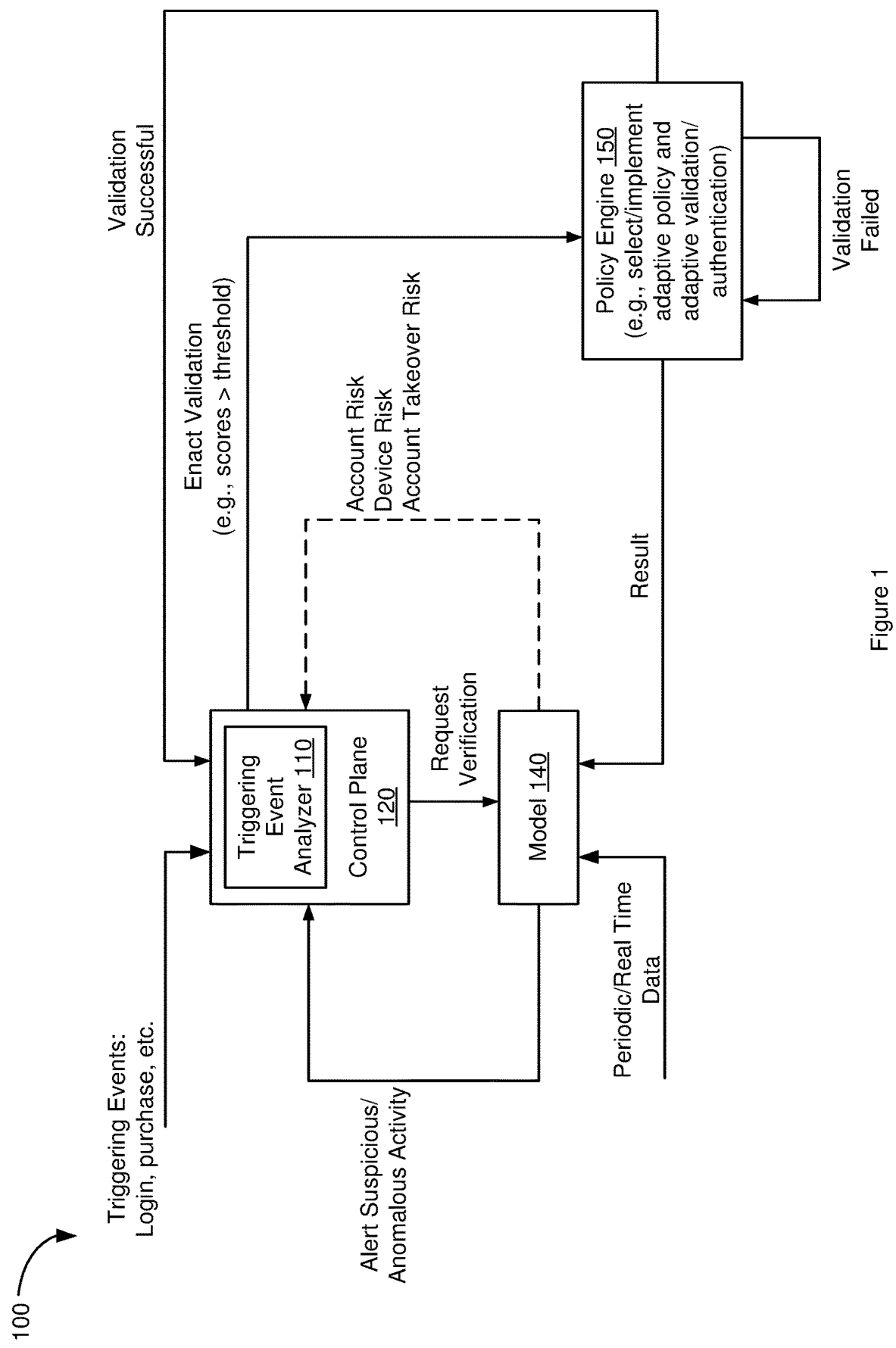
FIG. 1 is a block diagram of a portion of an example adaptive validation and remediation system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Adaptive validation and remediation techniques for credential fraud are described herein. In accordance with various embodiments, an adaptive validation and remediation method for credential fraud identifies credential fraud (e.g., credential stuffing) in media services using account characteristics and device characteristics and determines the level of suspicion. Various anti-fraud policies are then applied, where the anti-fraud policies specify various validation, verification, authentication, and/or remediation procedures corresponding to different levels of validation, authentication, and/or remediation based on the determined level of suspicion (including predictions of fraud in accounts and devices and the likelihood of an account takeover) in accordance with various embodiments described herein.

In accordance with various embodiments, an adaptive validation and remediation method includes determining, for a plurality of media service accounts, corresponding fraud suspicion values based on a model. The method also includes identifying a plurality of suspected accounts from the plurality of media service accounts based on the corresponding fraud suspicion values, wherein each of the plurality of suspect accounts has a corresponding fraud suspicion value that satisfies an account fraud detection criterion. The method additionally includes identifying one or more devices associated with each of the plurality of suspected accounts, where each of the one or more devices is associated with a device risk value that satisfies a device risk criterion. The method also includes predicting a likelihood of account takeover from each of the one or more devices. The method further includes detecting a triggering event from a device of the one or more devices associated with an account. The method additionally includes executing at least one of a validation procedure or a remediation procedure in response to the triggering event and based on a trigger sensitivity value associated with the triggering event, a respective likelihood of account takeover from the device associated with the account, a respective device risk value associated with the device, and a respective fraud suspicion value associated with the account.

EXAMPLE EMBODIMENTS

As described above, many users use the same username and password across multiple accounts. The credential reuse enables phishing attacks, and in particular, credential stuffing attacks. As credential stuffing attacks become more sophisticated and prevalent, using stolen credential for media services has increased significantly. Non-paying subscribers, who stole or purchased stolen credentials, use the stolen credentials to consume media content unbeknownst to the account owners. In some cases, malicious users purchase media services and goods (e.g., movies) using the credit card of the owner and/or lock out the account owners, e.g., by changing password. As such, credential stuffing is not only a form of stealing, e.g., from the service providers and/or identity theft, but also a breach of privacy to the account owners, e.g., revealing personal information.

Many previously existing solutions are ineffective against credential stuffing. Such solutions often enforce account validation or approval on a fixed set of triggering events. For example, in many previously existing systems, triggering events typically include new devices, expensive or unusual purchases, and/or account sensitive actions/transactions. In such systems, validation methods are often limited, e.g., sending a code to the registered telephone of the account owner, asking approval via the email of the account owner, asking a security question as part of an application, and/or requesting the owner to change the password. Such solutions are inadequate for a number of reasons.

First, some users voluntarily share their credentials, including their passwords, with a family member or a friend. As described above, a non-paying subscriber, who stole or purchased the stolen credential(s), may watch movies from another location without being noticed for months or years. It is difficult to differentiate between a sharer and a non-paying subscriber. Second, previously existing media subscription services often do not request validation. When validations are requested, because the validations are requested on every event and not adaptive, average users often find the validation requests burdensome. As a result, many users blindly confirm any validation requests, which in turn, defeats the purpose of validation. Third, because previously existing systems cannot effectively identify malicious users, different levels of validation are not available in such systems. For instance, users with a history of suspicious activities are not required to go through extra validation steps. Lastly, the validation methods in previously existing systems cannot effectively prevent a hostile account takeover. For example, users, who have access to an email account of the true owner, have the option of answering validation requests via email and can even change the password through the email validation for an account takeover.

An adaptive validation and remediation process described herein addresses the aforementioned issues. Using advanced analytics, machine learning, and operational intelligence, characteristics and activities associated with media service accounts and media consuming devices are analyzed and the levels of suspicion are determined. Depending on the level of suspicion, different levels of validations and/or verification procedures and different anti-fraud policies are applied to different accounts and/or devices in response to detecting different triggering events. As such, account validation or approval are adaptively enforced based on the level of suspicion.

FIG. 1 is a block diagram illustrating a portion of an exemplary adaptive validation and remediation system 100 in accordance with some embodiments. In the portion shown in FIG. 1, the exemplary system 100 includes a triggering event analyzer 110, a control plane 120, a model 140 established through machine learning, and a policy engine 150. In some embodiments, the triggering event analyzer 110 analyzes triggering events, e.g., a login, adding a new device to an account, and/or purchase, etc. Based on characteristics of the triggering events, the triggering event analyzer 110 provides to the control plane 120 a trigger sensitivity value for each of the triggering events.

In some embodiments, the triggering events are pre-set and/or pre-configured, e.g., by domain experts. In some other embodiments, the triggering events are identified by the system 100 based on anomalous behaviors. To determine the sensitivity values associated with an unseen anomalous behavior, the system 100 obtains past activities and the corresponding trigger sensitivity values associated with the past activities. The system 100 then identifies the triggering event as an anomaly based on the past activities, e.g., an unseen event. In some embodiments, the system 100 then determines a trigger sensitivity value of the triggering event based on characteristics of the triggering event and characteristics of the past events.

Figure 2:
FIG. 2 is an exemplary triggering event sensitivity table, in accordance with some embodiments.

For example, FIG. 2 illustrates an exemplary triggering event sensitivity table 200. Each triggering event is associated with a sensitivity value, e.g., buying a mobile phone has a sensitivity value of 90, changing an email address has a sensitivity value of 80, etc. In the exemplary triggering event sensitivity table 200, the email changing event has a higher sensitivity value than some other events, such as watching a new genre movie or entering a bad password. The higher sensitivity value indicates that the email changing event is potentially more suspicious and more likely associated with fraudulent activities, thus requires more attention. On the other hand, relative to buying a mobile phone or responding to a suspicion alert, the email changing event has a lower sensitivity value. The lower sensitivity value indicates that the act of changing an email address may not be as suspicious as purchasing a mobile device or responding to a suspicion alert.

Further, in the case of registering a new device is an unseen triggering event, registering a new device is likely more suspicious than watching a new genre movie (a sensitivity value of 30) but less suspicious than changing an email address (a sensitivity value of 80). On the other hand, registering a new device is most likely as suspicious as detecting the first time a new device is used to access an account (a sensitivity value of 60). As such, the new device registration event is assigned a sensitivity value of 50, higher than the sensitivity value of watching a new genre movie and lower than the sensitivity value of changing an email address, and approximately the same as the sensitivity value of detecting a first use of a new device. Accordingly, in some embodiments, a new entry is included in the exemplary table 200 to record the sensitivity value associated with the anomalous event.

Referring back to FIG. 1, in some embodiments, upon detecting triggering events, such as an unusual time of the day to login, purchasing a mobile device, etc., the control plane 120 sends a verification request to the model 140, e.g., by calling an application programming interface (API). In some embodiments, the model 140 is a supervised model (e.g., random forest or other suitable supervised machine learning methods). As will be described in further detail below with reference to FIG. 4, the model 140 is trained using known fraudulent accounts and known non-fraudulent accounts. In some embodiments, once trained, in response to the request from the control plane 120, the model 140 provides to the control plane 120 a fraud suspicion value indicating the account risk of an account, a device risk value indicating the risk of fraudulent activities on a device associated with an account, a likelihood of account takeover from a device associated with an account. The device risk value is useful for determining whether the device on which the triggering event is performed is used by the true owner, a non-paying subscriber, or even a malicious user. Upon receiving the risk values from the model 140 and the triggering event sensitivity values from the triggering event analyzer 110, the control plane 120 directs the policy engine 150 to select one or more policies and implement the selected policies to stop the suspected fraudulent activity.

In some embodiments, in response to the request from the control plane 120, the policy engine 150 applies different levels of validations. An exemplary policy table 300 is shown in FIG. 3. As shown in FIGS. 1 and 3, in some cases, when one verification fails, the policy engine 150 applies one or more policies later. As such, the applications of the policies are adaptive and the validation and/or remediation procedures taken are adaptive to the level of suspicion and the type of suspicion (e.g., the account suspicion and/or the device suspicion). In some embodiments, different levels of verifications are adapted to different levels of suspicious activities performed by different devices associated with different accounts. Embodiments of different levels of verifications include requests for reinserting a password, answering security question(s), answering information received during registration (e.g., nickname, middle name, phone number, etc., especially such account information is not displayed), answering questions regarding recent usage, answering identity questions related to an external database outside the scope of the system 100, biometric data, multi-factor authentication, and/or system notification document(s), etc.

According to the exemplary policy table 300 shown in FIG. 3, on one end of the spectrum, a respective trigger sensitivity value that is less than 30 indicates that most likely, the triggering event is not a fraudulent activity. Accordingly, there is no application of verification or fraud policies, e.g., no remediation procedures. On the other end of the spectrum, when the values of trigger sensitivity, the account risk, the device risk, and the account takeover risk are high, immediate remediation procedures are taken to stop the malicious activity, e.g., suspending the account and placing the device associated with the account on a blacklist. In some embodiments, when the risk and sensitivity values are in the middle of the range, a first validation or verification procedure according to a verification policy (e.g., requesting the user to provide a password) may be first executed. Depending on whether the verification fails or succeeds, one or more remediation procedures according to one or more fraud policies are executed, e.g., account suspension when the verification fails or sending a password change request when verification succeeds. In some embodiments, the validation results are sent to the control plane 120 as feedback.

Different from previously existing validation systems, the adaptive validation and remediation system 100 shown in FIG. 1 is dynamic. The system 100 combines operational security intelligence with real time data and utilizes both rule-based policies and machine learning to find the right balance between user experience and security. The system 100 maintains up-to-date risk values to reinforce learning, e.g., using the periodic data to update the features in the model 140 over time. Further, the updated learned data are used by the control plane 120 and/or the policy engine 150 to dynamically update the rules (e.g., the triggering event sensitivity table 200, FIG. 2) and the policies (e.g., the policy table 300, FIG. 3) for adaptive validation and remediation. Moreover, the system 100 uses past behaviors to predict future risks at both the account level and the device level. As a result, the system 100 is capable of tailoring different levels of validation and remediation for suspected fraudulent activities.

Figure 4:
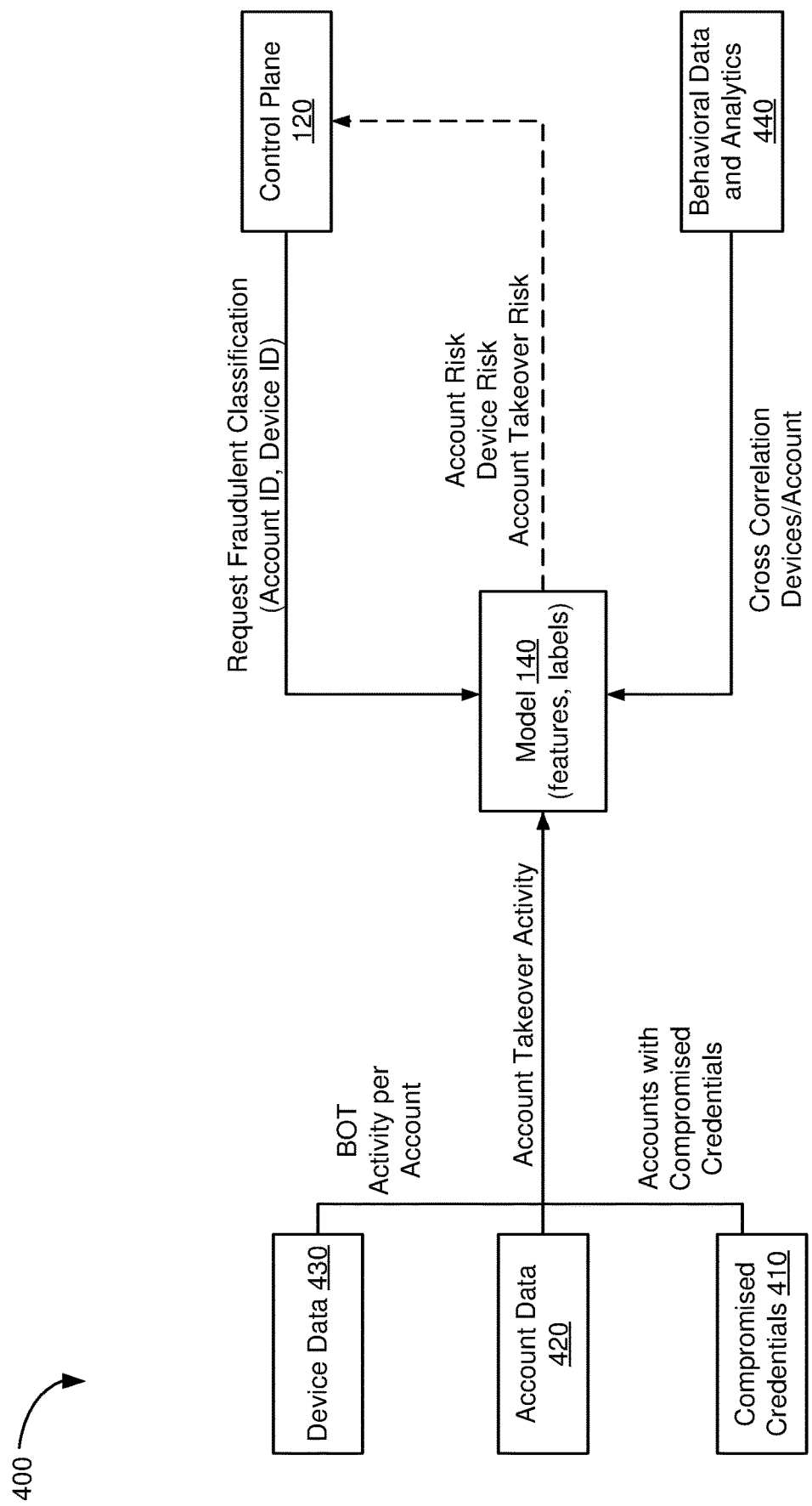
FIG. 4 is a diagram illustrating training a model and using the model for adaptive validation and remediation, in accordance with some embodiments.

FIG. 4 is a diagram 400 illustrating training the model 140 and using the model 140 for adaptive validation and remediation in accordance with some embodiments. In some embodiments, compromised credentials 410 are obtained, e.g., by searching the open Internet, dark web, and/or forum for credentials that are being sold. The media service account identifiers (IDs) are then located by checking the compromised credentials 210 against account data 420. In some embodiments, both the stolen accounts associated with the compromised credentials 410 and known non-fraudulent accounts are included in a training set for training the model 140.

In some embodiments, when training the model 140, stolen accounts characteristics (e.g., properties and activities) are obtained from the account data 420. In some embodiments, the account characteristics include, but not limited to, account registration data, account authentication and identification data (including credential changes), account viewing and consumption data (including time and duration of each activity), and/or account takeover activities.

Further, in some embodiments, when training the model 140, device characteristics (e.g., properties and activities) are obtained from the device data 430. In some embodiments, the device characteristics include, but not limited to, device configurations, device data describing user ID and user properties of a user using a respective device, device data describing the device location for each activity, data describing content or media offered for consumption on a respective device by a respective service, bot activities on a respective device per account. In some embodiments, based on the device characteristics, the devices are grouped and clustered into entities, e.g., based on patterns of viewing across common IP addresses and/or geographic locations.

Additionally, in some embodiments, when training the model 140, a behavioral data and analytics module 440 provides the context of the past behavior of a particular device and/or a particular account. Using the behavioral data, correlations, or lack of correlations among devices, accounts, users, and/or entities are established. Examples of correlations or lack of correlations are further described below with reference to FIG. 5.

Still referring to FIG. 4, in some embodiments, features in the model 140 are calculated dynamically over time. Such features include, but not limited to, the compromised credentials 410 obtained by commerce and/or credential sales sources, quantitative data extracted from the data sources, such as the account data 420, and/or the device data 430. In some embodiments, the features reflect the median, mean, sum, and/or quantiles of the quantitative data. Moreover, in some embodiments, the features are created per device, account, user, and/or entity. Additionally, labels are created in the model 140, where a negative label indicates a respective account being a stolen account and a positive label indicates a respective account being a non-fraudulent account.

Referring back to FIG. 1, once the model 140 is trained, the trained model 140 is applied across a plurality of accounts to locate accounts with similar features in accordance with some embodiments. After applying the model 140, depending on the characteristics of each account, each account has a corresponding fraud suspicion value. Some accounts have corresponding fraud suspicion values that satisfy an account fraud detection criterion, e.g., above a threshold. Such accounts are classified as suspected accounts, which indicate that there are suspected fraudulent activities associated with the accounts and the accounts are high risk. Further, in some embodiments, depending on the characteristics of each device, each device associated with an account has a corresponding device risk value. Some devices associated with certain accounts have corresponding device risk values that satisfy a device risk criterion, and such devices are identified as suspected devices associated with the suspected accounts and are considered high risk. In some embodiments, the device risk criterion is a threshold value and/or a range that separate those devices owned by a true account owner or owned by a non-paying subscriber who purchased or stole the credentials. For example, high risk devices that have device risk values above a threshold may be used by the non-paying subscriber who purchased or stole the credentials. In contrast, the devices that are owned by the true account owners may have device risk values below the threshold.

Additionally, in some embodiments, the model 140 predicts a likelihood of account takeover from each of the suspected devices associated with each of the suspected accounts. In credential stuffing attacks on media subscription services, many users purchase compromised credential(s) in order to receive a close-to-free service for as long as possible. Therefore, such users would do everything not to be noticed by the real account owner and/or the media provider. In some cases, malicious users may take hostile actions against the account owner and cause significantly more damage. Such actions include, for example, using private information in a damaging way (e.g., defamation), purchasing items using the credit account of the true owner, locking the true owner out of account by changing user identity, such as password, cellphone number, address, and the likes. In some embodiments, features in the model 140 for determining account takeover include, but not limited to, changing of password, email address, physical address, and/or security questions, different usage patterns post changing of password and/or other identity information, attempting large purchases, attempting purchases of items different from before, etc. Based on such features, the model 140 predicts a likelihood of account takeover (e.g., an account takeover risk score), which depicts the urgency of taking immediate action to limit the damage of each high risk device in a high risk account. In some embodiments, the model 140 receives periodic and/or real time data to improve results, e.g., incorporating feedback in active learning.

When the control plane 120 obtains the triggering events (e.g., as shown in FIG. 1), the control plane 120 requests a fraudulent classification of the account(s) and device(s) associated with the triggering events, e.g., by sending the account ID(s) and the device ID(s) to the model 140. In response to the request, the model 140 provides the fraud suspicion values reflecting the account risk, the device risk values, and the likelihood of a respective account takeover to the control plane 120. As described above with reference to FIG. 1, in response to receiving the values provided by the model 140, the control plane 120 enacts adaptive validations and remediations appropriate for the level of suspicions represented by the values.

Figure 5:
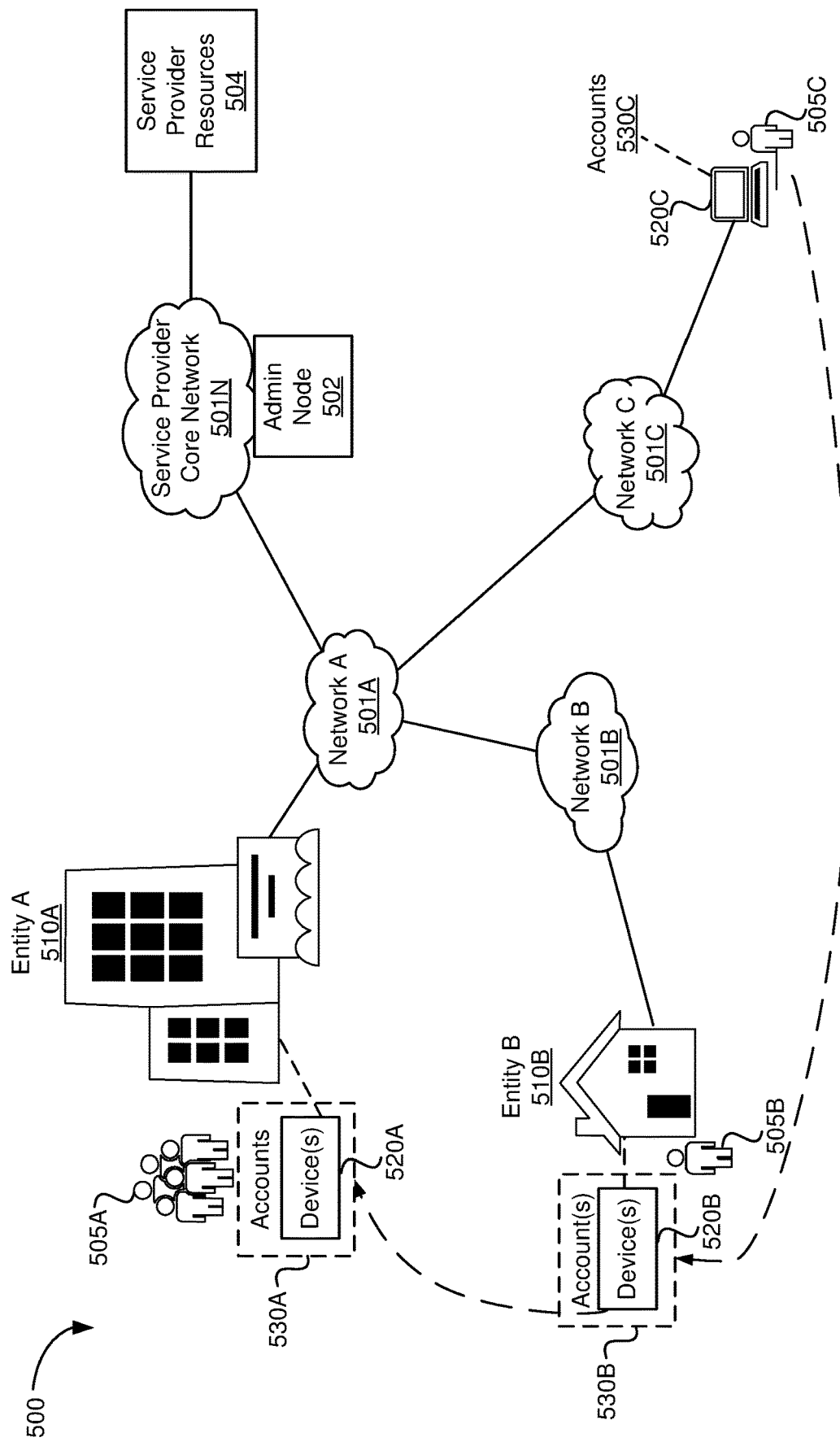
FIG. 5 is a block diagram illustrating monitoring correlations among devices, accounts, users, and entities in an exemplary adaptive validation and remediation system, in accordance with some embodiments.

FIG. 5 is a block diagram illustrating monitoring correlations among devices, accounts, users, and entities in an exemplary system 500 in accordance with some embodiments. In the exemplary system 500, a plurality of devices 520 (e.g., devices 520A-C, etc., collectively referred to as the devices 520) belong to a plurality of entities 510 (e.g., entity A 510A and entity B 510B, etc., collectively referred to as the entities 510) is directly or indirectly connected to a plurality of networks 501 (e.g., network A 501A-C and a service provider core network 501N, collectively referred to as the networks 501). Through the plurality of networks 501, the plurality of devices 520 (e.g., a plurality of set-top-boxes (STBs), TVs, mobile devices, and/or computing devices, etc.) accesses service provider resources 504 (e.g., video on demand (VOD) content, linear content, and other media content/services).

In some embodiments, the service provider core network 501N (also referred to as the core network 501N) includes a private and/or subscription-based network. The core network 501N includes any local area network (LAN) and/or wide area network (WAN) such as an intranet, an extranet, a virtual private network, and/or portions of the Internet. In various embodiments, the core network 501N includes a combination of computing devices, switches, routers, server systems, enterprise memory, data connections, and/or the like. In some embodiments, the core network 501N includes a network administration node 502 (or the like), which is arranged to monitor activities of the plurality of devices 520 and/or manage access to the service provider resources by a plurality of subscription accounts 530 (e.g., accounts 530A-C, etc., collectively referred to as the accounts 530) as described above with reference to FIGS. 1 and 4. Although FIG. 5 illustrates the network administration node 502, in some embodiments, the network administration node 502 is provided as a distributed system, including a suitable combination of software, data structures, virtual machines, computing devices, servers, switches, and/or routers. Accordingly, the network administration node 502 is described herein as a single entity for the sake of brevity and convenience of explanation.

As described above with reference to FIG. 4, the behavioral data and analytics module 440 provides the model 140 with behavioral data, e.g., geographic information, types of content requested, request timing, request frequency, etc. Such behavioral data are used to establish cross correlations among devices, accounts, users, and/or entities in accordance with some embodiments. In some embodiments, the model calculates the account and/or device risks based at least in part on the correlations or lack of correlations among the devices, accounts, users, and/or entities. For instance, lacking certain correlations can contribute to high risk values that indicate potentially fraudulent activities. When a true account owner shares a credential with someone, e.g., a family member, there is likely a higher correlation between the parties. On the other hand, when a non-paying subscriber steals the credential, the correlation between the parties is likely lower, e.g., their devices are located far away from each or they do not consume the same types of content, etc. In another example, a credential stuffing attacker may sell several credentials to a buyer and instructs the buyer to round robin between them for media services. As such, when the same device appears in multiple accounts for media consumption, the model calculates a high device risk value based at least in part on the correlation of one device to multiple accounts for media services. In such cases, the device risk value is an indicator to differentiating between a sharer (e.g., a family member who receives a shared credential from one account owner with the account owner's permission) and a non-paying subscriber (e.g., who bought or stole multiple credentials without the account's owner's knowledge).

In one example, the lack of correlation of information includes the lack of correlation between the types of content between the entities 510, the devices 520, the users 505, and/or the entities 510 over time. In another example, the lack of correlation of information includes the difference in geography between the devices 520, users 505, and/or entities 510 over time. In yet another example, the lack of correlation of information includes the distance in the networks 501 access by the devices 520, the users 505, and/or the entities 510 over time. In some embodiments, the detection of the lack of correlation of information also includes outlier detection in activities, e.g., the unusual amount of one particular activity, the increase or decrease of the number of devices 520 in a network, the surge of time spent on an activity, and/or unknown activity and/or device connection patterns in one or more networks 501, etc.

In some embodiments, the number of times the same device appears in multiple accounts establishes the lack of correlation of information. For example, in addition to being an outlier, the user 505C may be a buyer who bought multiple stolen credentials from a credential stuffing attacker. Using the stolen credentials on the same device 520C, the user 505C may rotate the accounts 503C in round robin for media services as a backup plan or as a way to not being caught by the service provider. As such, when the same device 520C appears in multiple accounts 530C for media consumption, the admin node 502 determines that the device 520C has a high device risk value based at least in part on the number of times the device 520C appears in the multiple accounts 530C. In such cases, the device risk value is an indicator to differentiating between a sharer and the non-paying subscriber 505C.

For instance, in the exemplary system 500, users 505A are associated with entity A 510A (e.g., a business). Based on the account, device, and/or behavioral data (e.g., account and/or device activities in a pre-fraudulent state), at the location of entity A 510A, users 505A typically use one or more devices 520A to access one or more accounts 530A. Further, based on the account, device, and/or behavioral data, users 505A typically request and receive one type of media content (e.g., business-related content streaming) via network A 501A. In contrast, based on the account, device, and/or behavioral data, at or near the location of a different entity B 510B (e.g., a home), user 505B typically uses one or more devices 520B to access one or more accounts 530B. User 505B typically requests and receives another type of media content (e.g., entertainment content streaming from a first service provider) via network B 501B. As such, features can be created to establish the correlations among the users 505A, entity A 510A, the one or more devices 520A, and the one or more accounts 530A. Likewise, features can be created to establish the correlations among the user 505B, entity B 510B, the one or more devices 520B, and the one or more accounts 530B. The features can also be created to reflect the lack of correlations between the users 505A and 505B, between the devices 520A and 520B, between the accounts 530A and 505B, and/or between the entities 510A and 505B.

In case the one or more devices 520B at the residential location deviate from the normal activities of streaming entertainment content and attempt to establish connections with network A 501A to gain access to the business-related content associated with the account(s) 530A, there is a lack of correlation of content types between entities 510A and 510B, between the users 505A and 505B, between the accounts 530A and 530B, and/or between the devices 520A and 520B. Based on the features (e.g., weights assigned to characteristics) reflecting the lack of correlations in the model, the model calculates the risk values associated with the accounts 530 and/or the devices 520.

In another example, when user 505C attempts to access media services associated with account 530B using device 520C, activities are analyzed by the behavioral data and analytics module 440 (FIG. 4). Based on the geographic location, the network address, the distance between the networks 501B and 501C, the number of activities, the timing of activities, and the number of accounts in which device 520C is associated, the attempt may be classified as an outlier. Based at least in part on the features reflecting the classification of outliers, the model determines the level of suspicion and the likelihood of fraud associated with the accounts 530 and/or the devices 520.

As described above, in previously existing systems, it is difficult to differentiate between a sharer and a passive non-paying subscriber, who purchases a stolen credential to receive a close-to-free service for as long as possible without being noticed. The establishment of correlations described herein in accordance with some embodiments enables differentiating a sharer from a non-paying subscriber. For example, typically the account owner and the sharer have some connections, e.g., family members (same location, similar login time), neighbors (within a threshold distance), and/or members of the same entity (same network, similar content type), etc. Based on characteristics of the devices 520, the accounts 530, the users 505, and/or the entities 510, most likely a device 520 used by a sharer to access an account has a different device risk value from a device used by a non-paying subscriber accessing the same account. Thus, the adaptive validation and remediation system described herein allows differentiating various usages and identifying various level of suspicions.

Figure 6:
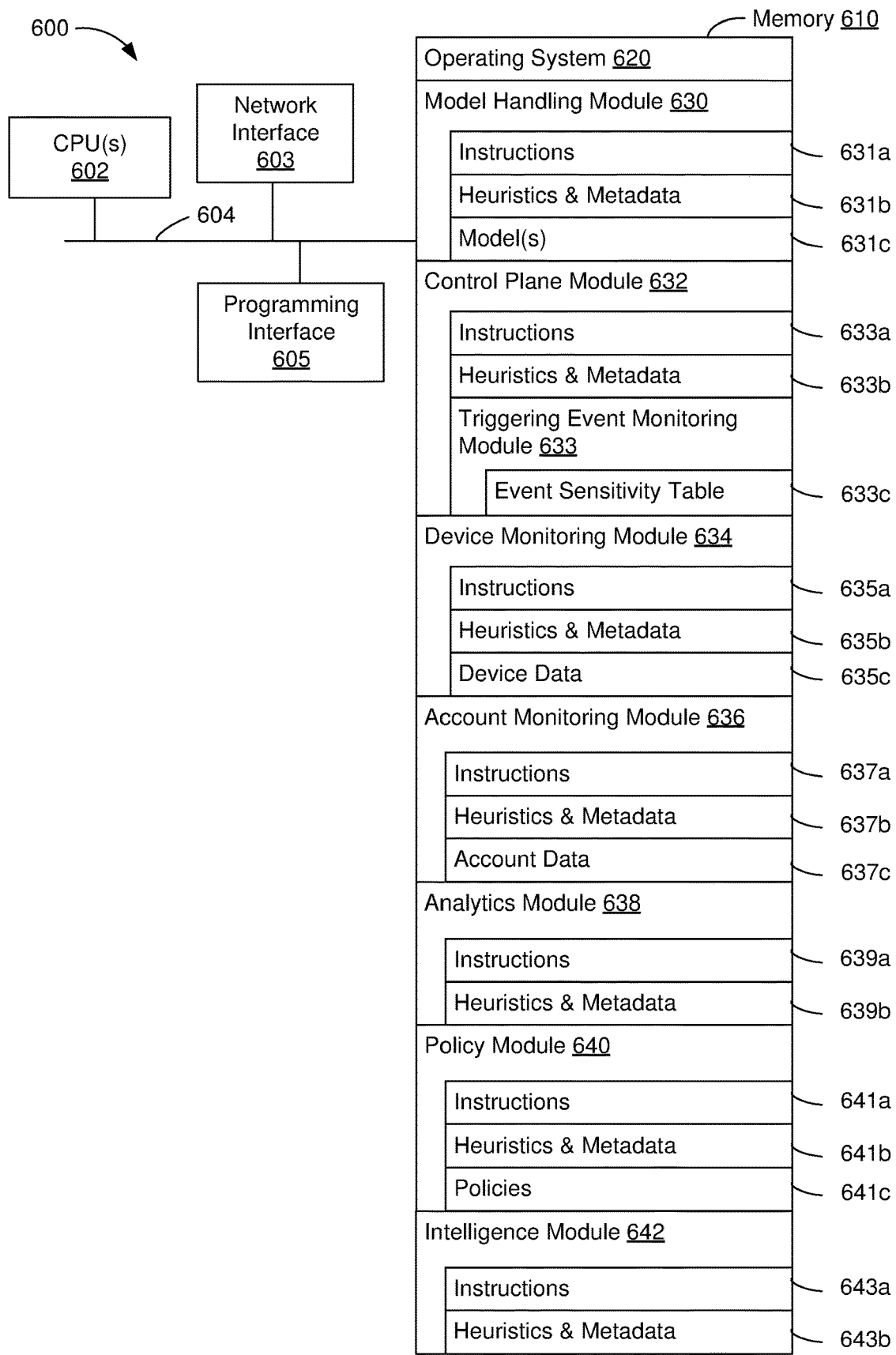
FIG. 6 is a block diagram of an example of a device, in accordance with some embodiments.

FIG. 6 is a block diagram of an example of a device 600 in accordance with some embodiments. For example, in some embodiments, the device 600 is similar to and adapted from the administrative node 502 in FIG. 5. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the device 600 includes one or more processing units (CPUs) 602, one or more network interfaces 603, a memory 610, a programming (I/O) interface 605, and one or more communication buses 604 for interconnecting these and various other components.

In some embodiments, the one or more communication buses 604 include circuitry that interconnects and controls communications between system components. The memory 610 includes high-speed random access memory, such as DRAM, SRAM, DDR RAM, or other random access solid state memory devices. In some embodiments, the memory 610 includes non-volatile memory, such as one or more magnetic disk storage devices, optical disk storage devices, flash memory devices, or other non-volatile solid state storage devices. The memory 610 optionally includes one or more storage devices remotely located from the one or more CPUs 602. The memory 610 comprises a non-transitory computer readable storage medium. In some embodiments, the memory 610 or the non-transitory computer readable storage medium of the memory 610 stores the following programs, modules, units, and data structures, or a subset thereof including an optional operating system 620, a model handling module 630, a control plane module 632 (which further includes a triggering event monitoring module 633), a device monitoring module 634, an account monitoring module 636, an analytics module 638, a policy module 640, and an intelligence module 642.

The operating system 620 includes procedures for handling various basic system services and for performing hardware dependent tasks.

In some embodiments, the model handling module 630 is configured to train and maintain model(s) 631c (e.g., the model 140 shown in FIGS. 1 and 4). To that end, in various embodiments, the model handling module 630 includes instructions and/or logic 631a, and heuristics and metadata 631b in addition to the model(s) 631c.

In some embodiments, the control plane module 632 (e.g., the control plane 120 shown in FIGS. 1 and 4) is configured to enact verifications and/or fraud policies, e.g., executing one or more validation and/or remediation procedures, in response to detection of triggering events by the triggering event monitoring module 633 (e.g., the triggering event analyzer 110, FIG. 1). In some embodiments, the triggering event monitoring module 633 maintains a triggering event sensitivity table 633c (e.g., the exemplary table 200, FIG. 2). Based on the triggering event sensitivity table 633c and the detected triggering event, the triggering event monitoring module 633 provides the corresponding sensitivity value associated with the triggering event to the control plane module 632. To that end, in various embodiments, the control plane module 632 includes instructions and/or logic 633a, and heuristics and metadata 633b.

In some embodiments, the device monitoring module 634 is configured to maintain device data 635c and analyze device properties and activities from devices, e.g., maintaining and analyzing the device data 430 (FIG. 4). The device properties and activities are then provided to the model handling module 630. To that end, in various embodiments, the device monitoring module 634 includes instructions and/or logic 635a, and heuristics and metadata 635b.

In some embodiments, the account monitoring module 636 is configured to maintain account data 637c and analyze account properties and activities of accounts, e.g., maintaining and analyzing the account data 420 (FIG. 4). The account properties and activities are then provided to the model handling module 630. To that end, in various embodiments, the account monitoring module 636 includes instructions and/or logic 637a, and heuristics and metadata 637b.

In some embodiments, the analytics module 638 (e.g., the behavior data and analytics module 440, FIG. 4) is configured to establish cross correlations of activities, attributes, and/or properties among devices, accounts, users, and/or entities, and provide the cross correlations to the model handing module 630. To that end, in various embodiments, the analytics module 638 includes instructions and/or logic 639a, and heuristics and metadata 639b.

In some embodiments, the policy module 640 (e.g., the policy engine 150, FIG. 1) is configured to maintain policies 641c, e.g., the exemplary policies as shown in FIG. 3. In some embodiments, in response to the request from the control plane module 632, the policy module 640 is configured to select one or more policies based on the risk values calculated by the modeling handling module 630 and apply the one or more policies for adaptive validation and remediation. To that end, in various embodiments, the policy module 640 includes instructions and/or logic 641a, and heuristics and metadata 641b.

In some embodiments, the intelligence module 642 is configured to gather compromised credentials (e.g., the compromised credentials 410 in FIG. 4) by searching the open Internet, dark web, and/or forums for credentials that are being sold. The intelligence module 642 is further configured to locate media service accounts that use the compromised credentials. The model 140 then uses the located media service accounts as fraudulent accounts during training. To that end, in various embodiments, the intelligence module 642 includes instructions and/or logic 643a, and heuristics and metadata 643b.

Although the model handling module 630, the control plane module 632, the triggering event monitoring module 633, the device monitoring module 634, the account monitoring module 636, the analytics module 638, the policy module 640, and the intelligence module 642 are illustrated as residing on a single device (e.g., the device 600), it should be understood that in other embodiments, any combination of the model handling module 630, the control plane module 632, the triggering event monitoring module 633, the device monitoring module 634, the account monitoring module 636, the analytics module 638, the policy module 640, and the intelligence module 642 may reside on separate devices.

Moreover, FIG. 6 is intended more as a functional description of the various features which be presented in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

Figure 7:
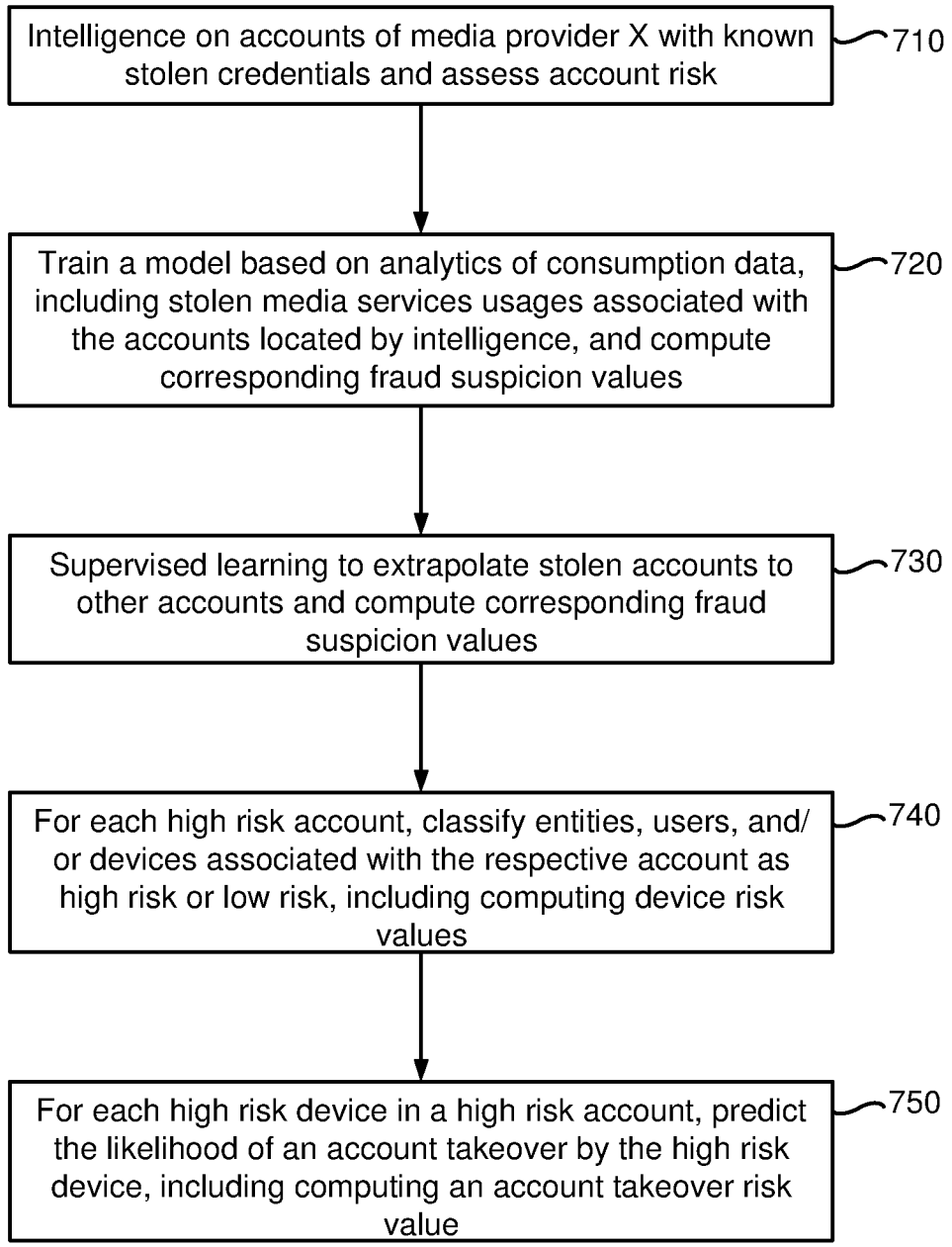
FIG. 7 is a flowchart illustrating training and using a model for validation and remediation of credential fraud, in accordance with some embodiments.

FIG. 7 is a flowchart representation of a method 700 for training and using a model for validation and remediation of credential fraud in accordance with some embodiments. In some embodiments, the method 700 is performed by a device with one or more processors and non-transitory memory, such as the administration node 502 in FIG. 5 and/or the device 600 in FIG. 6. In some embodiments, the method 700 is performed by processing logic, including hardware, firmware, software, or a combination thereof. In some embodiments, the method 700 is performed by a processor (e.g., the CPU(s) 602 in FIG. 6) the executing code stored in a non-transitory computer-readable medium (e.g., a memory and/or the memory 610 in FIG. 6).

To that end, as represented by block 710, the method 700 includes gathering intelligence (e.g., by the intelligence module 642, FIG. 6) to locate fraudulent accounts being sold. For example, as shown in FIG. 4, compromised credentials 410 sold on the open Internet, dark web, and/or forums are collected. In the intelligence gathering step, media service accounts of one or more media providers that use the compromised credentials are located and analyzed. Such accounts are labeled as fraudulent accounts for training a supervised model.

The method 700 further includes, as represented by blocks 720 and 730, training a model and running the trained model, e.g., by the model handling module 630 (FIG. 6). For example, as shown in FIG. 4, during the model training step, characteristics of the fraudulent accounts located in the intelligence gathering step are analyzed, including analyzing properties of the accounts and activities of the accounts. Examples of such characteristics, as shown in FIG. 4, include consumption data, stolen media services usages, account takeover activities, and/or bot activities within the fraudulent accounts. Further as shown in FIG. 4, features and labels are created and included in the model 140. In some embodiments, the model 140 is a supervised model, such as random forest, support vector machines, or other suitable supervised models. Once trained, the model 140 is applied to a plurality of accounts, i.e., to extrapolate characteristics of the stolen accounts to other accounts that have not been identified by intelligence. In order to locate other suspected fraudulent accounts that may not have been noticed by the intelligence step, the model 140 calculates corresponding fraud suspicion values for the plurality of accounts based on the account characteristics. When an account has a corresponding fraud suspicion value that satisfies an account fraud detection criterion, e.g., above a threshold value, the account is classified as a suspected account, e.g., a high risk account.

As represented by block 740, for each high risk account, the method 700 includes classifying entities, users, and/or devices associated with the respective high risk account as high risk or low risk. For instance, as shown in FIGS. 1 and 4, the model 140 provides to the control plane 120 a device risk value associated with a device associated with an account. When the device risk value satisfies a device risk criterion, e.g., above a threshold, the device is classified as high risk. Accordingly, when the account owner's device does not satisfy the device risk criterion and is classified as low risk, the fraudulent devices and the account owner's devices can be differentiated. For example, in FIG. 5, device 520C may have a high device risk value and classified as a high risk device associated with account(s) 530B, whereas device(s) 520B may have low device risk values and classified as low risk device(s) associated with account(s) 530B. The high risk value indicates that device 520C is likely a device used for fraudulent activities. In contrast, device(s) 520B are likely device(s) used by account owner 505B associated with account(s) 530B or a sharer (e.g., a family member).

Still referring to FIG. 7, the method 700 includes, as presented by block 750, for each high risk device associated with a high risk account, with the model computing an account takeover risk value and predicting the likelihood of an account takeover by the high risk device. In other words, quantitative values are assigned to the high risk devices to determine the likelihood of the high risk devices performing malicious activities, e.g., an account takeover. In some embodiments, when detecting a triggering event from a device associated with an account, one or more validation and/or remediation procedures are executed in response to the triggering event and based on a trigger sensitivity value associated with the triggering event, a respective likelihood of account takeover from the device associated with the account, a respective device risk value associated with the device, and a respective fraud suspicion value associated with the account. For example, as shown in FIGS. 1 and 3, the policy engine 150 can execute a first procedure (e.g., validation, authentication, and/or verification) in accordance with a first policy, e.g., a verification policy. In the case of a failed verification, authentication, and/or verification, the policy engine 150 can execute a second procedure (e.g., account suspension) in accordance with a second policy, e.g., a fraud policy. In the case of a successful validation, the policy engine 150 executes a third procedure (e.g., request password change) in accordance with a third policy, e.g., another fraud policy. Further shown in FIG. 3, when there is a high risk of account takeover, e.g., the account takeover risk value is above 20, the policy engine directly executes the fraud policy without executing any verification policy, e.g., suspending the account.

Figure 8:
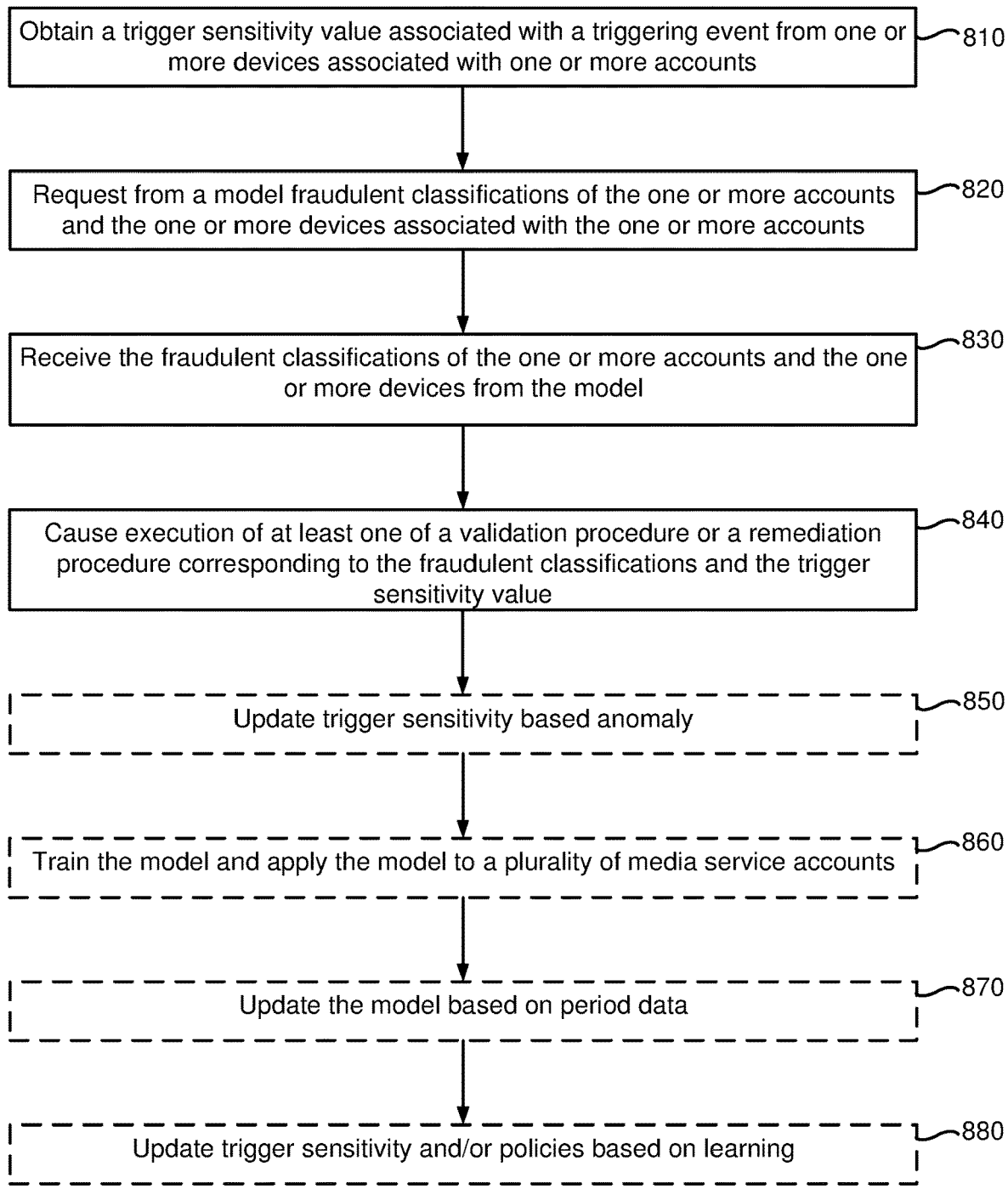
FIG. 8 is a flowchart illustrating an adaptive validation and remediation method, in accordance with some embodiments.

FIG. 8 is a flowchart representation of a method 800 for adaptive validation and remediation of credential fraud in accordance with some embodiments. In some embodiments, the method 800 is performed by a device with one or more processors and non-transitory memory, such as the administration node 502 in FIG. 5 and/or the device 600 in FIG. 6. In some embodiments, the method 800 is performed by processing logic (e.g., the control plane module 632 in FIG. 6 and/or the control plane 120 in FIGS. 1 and 4), including hardware, firmware, software, or a combination thereof. In some embodiments, the method 800 is performed by a processor (e.g., the CPU(s) 602 in FIG. 6) the executing code stored in a non-transitory computer-readable medium (e.g., a memory and/or the memory 610 in FIG. 6).

To that end, as represented by block 810, the method 800 includes obtaining a trigger sensitivity value associated with a triggering event from one or more devices associated with one or more accounts. The method 800 further includes, as represented by block 820, requesting from a model fraudulent classifications of the one or more accounts and the one or more devices associated with the one or more accounts, wherein the fraudulent classifications indicate a respective likelihood of account takeover from a respective device of the one or more devices, a respective device risk value associated with the respective device associated with a respective account of the one or more accounts, and a respective fraud suspicion value associated with the respective account. As represented by block 830, the method 800 further includes receiving the fraudulent classifications of the one or more accounts and the one or more devices from the model. As represented by block 840, the method 800 also includes causing execution of at least one of a validation procedure or a remediation procedure corresponding to the fraudulent classifications and the trigger sensitivity value.

For example, as shown in FIG. 1, the triggering event analyzer 110 detects triggering events. The triggering event analyzer 110 further obtains a triggering sensitivity value corresponding to a triggering event according to the triggering event sensitivity table. According to the exemplary trigger sensitivity table 200 as shown in FIG. 2, in case the triggering event is changing an email address, the trigger sensitivity value is 80. In response to obtaining the trigger sensitivity value, the control plane 120 in FIG. 1 requests from the model 140 fraudulent classifications to verify whether the device from which the email address is changed is a high risk device, whether the account associated with the email address is a high risk account, and whether the account takeover risk is high. The model 140, in response to the request from the control plane 120 and based on characteristics of the account and the device, calculates and provides to the control plane a fraud suspicion value of the account, a device risk value of the device, and a prediction of the account takeover risk. In the case of the fraud suspicion value of the account is 60, the device risk value of the device is 35, and the prediction of the account takeover risk is 15, the control plane 140 directs the policy engine 150 to execute one or more validation and/or remediation procedures according to one or more policies. According to the exemplary policy table 300 as shown in FIG. 3, the policy engine 150 selects requesting the user to answer one or more security questions as a verification policy. The policy engine 150 then sends the security question(s) to the device where the triggering event was detected and receives the results. In case the user fails to answer the security question(s), the policy engine 150 selects account suspension as the fraud policy to implement. In case the user succeeds answering the security question(s), the policy engine 150 selects requesting a password change as the fraud policy to implement.

Referring back to FIG. 8, as represented by block 850, in some embodiments, the method 800 includes detecting the triggering event as an anomaly based on past activities, and assigning the trigger sensitivity value based on one or more of characteristics of the triggering event, characteristics of the past activities, characteristics of known triggering events, and trigger sensitivity values associated with the known triggering events. In other words, in some embodiments, the trigger sensitivity table 200 is dynamic and the trigger sensitivity values can be updated over time. When the trigger event analyzer 110 detects an unseen triggering event, based on context, history, and characteristics of events, entries and/or values in the trigger sensitivity table 200 can be updated.

In some embodiments, as represented by block 860, the method 800 includes training the model and applying the model to a plurality of media service accounts to locate suspected fraudulent accounts that may not have been detected by the intelligence. In some embodiments, to train the model, the method 800 includes training the model using known fraudulent accounts and non-fraudulent accounts, wherein the model includes features and labels. In some embodiments, once the model is trained, the method 800 further includes causing the model to classify a plurality of media service accounts as high risk or low risk based on characteristics of the one or more accounts and features in the model, wherein the model associates each high risk account with a fraud suspicion value that satisfies an account fraud detection criterion. Having located suspected fraudulent accounts (e.g., high risk accounts), the method 800 includes causing the model to classify a device associated with a high risk account as high risk or low risk based on characteristics of the device and features in the model, wherein the model associates each high risk device with a device risk value that satisfies a device risk criterion. Additionally, the method 800 includes causing the model to predict a likelihood of account takeover from a high risk device associated with a high risk account.

In some embodiments, as represented by block 870, the method 800 further includes updating the features and the labels based on period data, wherein the period data includes one or more of results from executing at least one of the validation procedure or the remediation procedure, account data, device data, and intelligence data.

In some embodiments, as represented by block 880, the method 800 further includes updating one or more of trigger sensitivity values associated with a plurality of triggering events and updating one or more policies associated with the at least one of the validation procedure or the remediation procedure based on the features and the labels.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a server including one or more processors and a non-transitory memory, wherein the server is located in a core network for providing media content resources to a plurality of devices in a plurality of networks:
   determining, by the server, for a plurality of media service accounts, corresponding fraud suspicion values based on a model stored in the non-transitory memory, wherein the corresponding fraud suspicion values indicate suspected fraudulent activities from the plurality of media service accounts for accessing the media content resources, and the model is trained using account characteristics and device characteristics of known fraudulent accounts and known non-fraudulent accounts to calculate features for each account and each device;
   identifying, by the server and using the model, a plurality of suspected accounts from the plurality of media service accounts based on the corresponding fraud suspicion values, wherein each of the plurality of suspect accounts has a corresponding fraud suspicion value that satisfies an account fraud detection criterion;
   identifying, by the server and using the model, one or more high risk devices that establish connections in the plurality of networks using each of the plurality of suspected accounts for obtaining media content, wherein each of the one or more high risk devices is associated with a device risk value that satisfies a device risk criterion, the device risk value is determined by the model based on one or more features derived from a respective high risk device having low correlations with a plurality of features derived from the plurality of suspected accounts, and the one or more features represent activities of obtaining the media content by the high risk device via the connections in the plurality of networks;

predicting, by the server and using the model, a likelihood of account takeover from each of the one or more high risk devices associated with each of the suspected accounts based at least in part on the features derived by the model associated with account takeover activities;

detecting, by the server, a triggering event from a device of the one or more high risk devices associated with an account in the plurality of networks; and selecting, by the server, at least one procedure in response to the triggering event for execution, wherein the at least one procedure corresponds to a determined level of suspicion calculated based on a trigger sensitivity value associated with the triggering event, a respective likelihood of account takeover from the device associated with the account, a respective device risk value associated with the device, and a respective fraud suspicion value associated with the account.

2. The method of claim 1, further comprising:
labeling a first set of accounts and a second set of accounts, wherein the first set of accounts has a first set of characteristics associated with the known fraudulent accounts and the second set of accounts has a second set of characteristics associated with the non-fraudulent accounts;

extracting a set of features from the first set of characteristics and the second set of characteristics; and establishing the model using the set of features and the labeling of the first set of accounts and the second set of accounts.

3. The method of claim 2, further comprising:
obtaining compromised accounts through intelligence; and identifying the known fraudulent accounts with account identifiers of the compromised accounts.

4. The method of claim 2, wherein extracting the set of features from the first set of characteristics and the second set of characteristics includes:
establishing correlations among one or more of entities, users, and devices associated with the plurality of media service accounts; and determining the set of features based on the correlations.

5. The method of claim 2, wherein extracting the set of features from the first set of characteristics and the second set of characteristics includes:
identifying lack of correlations among one or more of entities, users, and devices associated with the plurality of media service accounts; and determining the set of features based on the lack of correlations, including number of media service accounts a respective device is associated with.

6. The method of claim 1, wherein:
the account fraud detection criterion includes a threshold that indicates a level of suspected fraudulent activity associated with a respective account; and identifying, by the server and using the model, the plurality of suspected accounts from the plurality of media service accounts includes:
determining the corresponding fraud suspicion values of the plurality of suspected accounts based on characteristics of the plurality of suspected accounts and the features derived by the model;

comparing the corresponding fraud suspicion values with the threshold; and classifying the plurality of suspected accounts as high risk in accordance with a determination that each of the plurality of suspected accounts has the corresponding fraud suspicion value above the threshold.

7. The method of claim 1, wherein:
the device risk criterion includes a threshold that indicates a level of suspected fraudulent activity from a respective device with a respective account; and identifying, by the server and using the model, the one or more high risk devices that establish connections in the plurality of networks using each of the plurality of suspected accounts for obtaining the media content includes:
obtaining a pre-fraudulent state of each of the one or more high risk devices obtaining the media content over the connections using each of the plurality of suspected accounts;

calculating the device risk value for each of the one or more high risk devices based on deviations of the characteristics of the one or more high risk devices obtaining the media content over the connections using each of the suspected accounts from the characteristics in the pre-fraudulent state, including changes in number of media service accounts a respective device is associated with; and classifying the one or more high risk devices as high risk in accordance with a determination that each of the one or more high risk devices has the device risk value above the threshold.

8. The method of claim 1, further comprising:
grouping the one or more high risk devices into one or more entities based on at least one of network or geographic locations from which media content is consumed; and determining the features by the model based on the grouping.

9. The method of claim 1, wherein predicting, by the server and using the model, the likelihood of account takeover from each of the one or more high risk devices associated with each of the suspected accounts based at least in part on the features derived by the model associated with the account takeover activities includes:
identifying the features in the model that indicate likelihoods of account takeover; and predicting the likelihood of the account takeover for each of the one or more high risk devices associated with each of the suspected fraudulent accounts based on activities on each of the one or more high risk devices and the features.

10. The method of claim 1, wherein detecting, by the server, the triggering event from the device of the one or more high risk devices associated with the account includes:
obtaining past activities associated with the device and trigger sensitivity values associated with the past activities;

detecting the triggering event as an anomaly based on the past activities; and assigning the trigger sensitivity value associated with the triggering event based on characteristics of the triggering event, characteristics of the past activities, and the trigger sensitivity values associated with the past activities.

11. The method of claim 1, wherein selecting, by the server, the at least one procedure for execution includes:
permitting media service associated with the account from the device in accordance with a determination that the trigger sensitivity value, the respective likelihood of account takeover, the respective device risk value, and the respective fraud suspicion value associated with the account satisfy a first set of criteria.

12. The method of claim 1, wherein selecting, by the server, the at least one procedure for execution includes:
selecting a validation procedure as the procedure for execution in accordance with a determination that the trigger sensitivity value, the respective likelihood of account takeover, the respective device risk value, and the respective fraud suspicion value satisfy a set of criteria;
determining whether or not the validation procedure succeeds in execution;
selecting a first remediation procedure as the procedure for execution in accordance with a determination that the validation procedure succeeds in execution; and
selecting a second remediation procedure, different from the first remediation procedure, as the procedure for execution in accordance with a determination that the validation procedure does not succeed in execution.

13. The method of claim 1, wherein:
the trigger sensitivity value, the respective likelihood of account takeover, the respective device risk value, and the respective fraud suspicion value satisfy a set of criteria indicating a high risk level of account takeover; and
executing the at least one procedure for execution includes ceasing providing the media content resources to the device associated with the account.

14. A server comprising:
one or more processors;
a non-transitory memory; and
one or more programs stored in the non-transitory memory, which, when executed by the one or more processors, cause the server to:
determine, for a plurality of media service accounts, corresponding fraud suspicion values based on a model stored in the non-transitory memory, wherein the corresponding fraud suspicion values indicate suspected fraudulent activities from the plurality of media service accounts for accessing the media content resources, and the model is trained using account characteristics and device characteristics of known fraudulent accounts and known non-fraudulent accounts to calculate features for each account and each device;
identify, using the model, a plurality of suspected accounts from the plurality of media service accounts based on the corresponding fraud suspicion values, wherein each of the plurality of suspect accounts has a corresponding fraud suspicion value that satisfies an account fraud detection criterion;
identify, using the model, one or more high risk devices that establish connections in the plurality of networks using each of the plurality of suspected accounts for obtaining media content, wherein each of the one or more high risk devices is associated with a device risk value that satisfies a device risk criterion, the device risk value is determined by the model based on one or more features derived from a respective high risk device having low correlations with a plurality of features derived from the plurality of suspected accounts, and the one or more features represent activities of obtaining the media content by the high risk device via the connections in the plurality of networks;
predict, using the model, a likelihood of account takeover from each of the one or more high risk devices associated with each of the suspected accounts based at least in part on the features derived by the model associated with account takeover activities;
detect a triggering event from a device of the one or more high risk devices associated with an account in the plurality of networks; and
select, by the server, at least one procedure in response to the triggering event for execution, wherein the at least one procedure corresponds to a determined level of suspicion calculated based on a trigger sensitivity value associated with the triggering event, a respective likelihood of account takeover from the device associated with the account, a respective device risk value associated with the device, and a respective fraud suspicion value associated with the account.

15. A method comprising:
at a server including one or more processors and a non-transitory memory, wherein the server is located in a core network for providing media content resources to a plurality of devices in a plurality of networks:
obtaining, by the server, a trigger sensitivity value associated with a triggering event detected by the server and originated from one or more devices that establish connections in the plurality of networks using one or more media service accounts for accessing the media content resources in the plurality of networks;
requesting, by the server and from a model stored in the non-transitory memory, fraudulent classifications of the one or more media service accounts and the one or more devices that establish connections in the plurality of networks using the one or more media service accounts, wherein the model is trained using account characteristics and device characteristics of known fraudulent accounts and known non-fraudulent accounts to calculate features for each account and each device, each of the fraudulent classifications indicates a respective likelihood of account takeover from a respective device of the one or more devices for accessing the media content resources, a respective device risk value associated with the respective device representing a device risk of using a respective media service account of the one or more media service accounts on the respective device to perform fraudulent activities accessing the media content resources, and a respective fraud suspicion value associated with the respective media service account representing suspected fraudulent activities from the respective media service account for accessing the media content resources;
receiving, by the server and from the model, the fraudulent classifications of the one or more media service accounts and the one or more devices; and
selecting, by the server, at least one procedure for execution, wherein the at least one procedure corresponds to a determined level of suspicion calculated based on the fraudulent classifications and the trigger sensitivity value.

16. The method of claim 15, further comprising:

detecting the triggering event as an anomaly based on past activities; and assigning the trigger sensitivity value based on one or more of characteristics of the triggering event, characteristics of the past activities, characteristics of known triggering events, and trigger sensitivity values associated with the known triggering events.

17. The method of claim 15, further comprising:

training the model using the known fraudulent accounts and the non-fraudulent accounts, wherein the model includes the features and labels;

causing the model to classify a plurality of media service accounts as high risk or low risk based on characteristics of the one or more media service accounts and the features derived by the model, wherein the model associates each high risk account with a fraud suspicion value that satisfies an account fraud detection criterion;

causing the model to classify a device associated with a high risk account as high risk or low risk based on characteristics of the device and features in the model, wherein the model associates each high risk device with a device risk value that satisfies a device risk criterion; and causing the model to predict a likelihood of account takeover from a high risk device associated with a high risk account.

18. The method of claim 17, further comprising:

updating the features and the labels based on period data, wherein the period data includes one or more of results from executing the at least one of the validation procedure or the remediation procedure, account data, device data, and intelligence data.

19. The method of claim 17, further comprising:

updating one or more of trigger sensitivity values associated with a plurality of triggering events and updating one or more policies associated with the at least one of the validation procedure or the remediation procedure based on the features and the labels.

20. A server comprising:

one or more processors;

a non-transitory memory; and one or more programs stored in the non-transitory memory, which, when executed by the one or more processors, cause the device to:

obtain a trigger sensitivity value associated with a triggering event detected by the server and originated from one or more devices associated with one or more media service accounts for accessing the media content resources in the plurality of networks;

request from a model fraudulent classifications of the one or more media service accounts and the one or more devices that establish the connections in the plurality of networks using the one or more media service accounts, wherein the model is trained using account characteristics and device characteristics of known fraudulent accounts and known non-fraudulent accounts to calculate features for each account and each device, each of the fraudulent classifications indicates a respective likelihood of account takeover from a respective device of the one or more devices for accessing the media content resources, a respective device risk value associated with the respective device representing a device risk of using a respective media service account of the one or more media service accounts on the respective device to perform fraudulent activities accessing the media content resources, and a respective fraud suspicion value associated with the respective media service account representing suspected fraudulent activities from the respective media service account for accessing the media content resources;

receive from the model the fraudulent classifications of the one or more media service accounts and the one or more devices from the model; and select at least one procedure for execution, wherein the at least one procedure corresponds to a determined level of suspicion calculated based on the fraudulent classifications and the trigger sensitivity value.

* * * * *